Patented Dec. 21, 1943

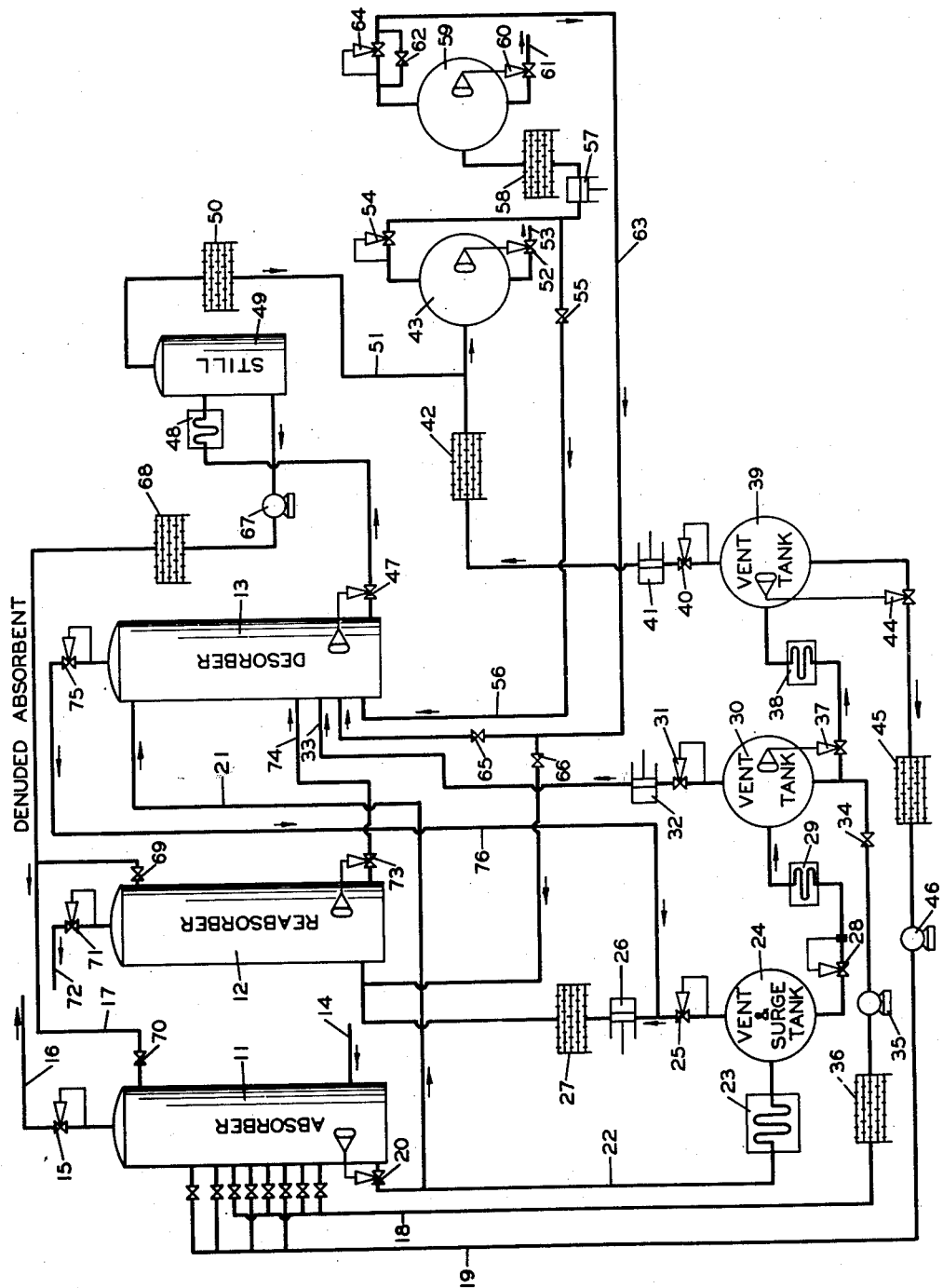

2,337,254

UNITED STATES PATENT OFFICE 2,337,254

METHOD OF RECOVERING HYDROCARBONS

Harold R. Legatski, Will Swerdloff, and Gerald W. McCullough, Bartlesville, Okla., assignors to Phillips Petroleum Company, a corporation of Delaware Application August 2, 1940, Serial No. 349,590

2 Claims. (Cl. 196—8)

This invention relates to an improved method for recovering all but the most volatile fraction of hydrocarbon gases.

This invention is a continuation-in-part of the co-pending application, Serial No. 181,053, filed December 21, 1937, which application issued as Patent 2,299,830 on October 27, 1942.

An important object of the invention is to recover a greater amount of the desirable fractions without increasing the distillation equipment.

A further object of the invention is to recover a larger amount of the lighter or more volatile desirable fractions without unduly increasing the recovery of the more volatile undesirable fractions.

A still further object of the invention is to effect a rough separation of the components according to volatility.

With reference to the drawing, the figure is a diagrammatic elevation view of a system embodying the present invention.

Referring to the drawing, a main absorber is designated by the numeral 11 and supplemental absorbers by the numerals 12 and 13. These absorbers may be any suitable contacting devices, preferably bubble plate columns, in which a stream of gas may be borught into intimate countercurrent contact with a stream of liquid. To distinguish between these absorbers, the terminology used hereinafter shall be, "absorber," designated by numeral 11; "reabsorber," designated by numeral 12; and "desorber," designated by numeral 13. Gas to be processed is admitted to the base of the absorber 11 through the pipe 14 and residue gas leaves the top of the absorber through the back pressure regulator 15 and the pipe 16. Pipes 17, 18, and 19 are connected to the absorber 11 for the admission of absorbent, pipes 18 and 19 having branches for admitting the oil at various points in the absorber. Rich absorbent leaves the base of the absorber through the float controlled valve 20. The stream of rich absorbent is divided, part flowing through the pipe 21 to the top of the desorber 13 and part flowing through the pipe 22 and heater 23 to the vent and surge tank 24. The vapor from the vent tank 24 is passed by a back pressure regulator 25 to a compressor 26 which compresses the vapors and pumps them through the cooler 27 to the base of the reabsorber 12. Liquid from the vent tank 24 as controlled by a rate-of-flow controller 28 is passed through the heater 29 to a second vent tank 30. Vapors from the vapor space of the vent tank 30 pass through the back pressure regulator 31 to the compressor 32 where they are compressed and sent through pipe 33 to the desorber 13. The flashing off of gases and vapors in the vent and surge tank 24 and in the vent tank 30 effects partial denudation of the absorbent. Partly denuded absorbent from the vent tank 30 is divided into two streams, one passing through the control valve 34, the pump 35, the cooler 36 and the pipe 18 to the absorber; and the other passing through the float controlled valve 37 and the heater 38 to the third vent tank 39. Vapors from the vent tank 39 are withdrawn through the back pressure regulator 40, compressed by the compressor 41, cooled in the cooler 42 and passed to the product accumulator 43. Partly denuded absorbent, having a greater degree of denudation than that from the vent tank 30 is withdrawn from the vent tank 39 through the float controlled valve 44 and the cooler 45 to the pump 46 from which it is pumped through the pipe 19 into the absorber 11.

The rich absorbent entering the top of the desorber 13 through the pipe 21 is countercurrently contacted with gases entering the base of the desorber. Desorber 13 accomplishes substantially complete removal of methane from the absorbent stream. The demethanized rich absorbent from the base of the desorber as controlled by the float controlled valve 47 is sent through the heater 48 to a conventional still 49 for stripping or denudation. Such a still is well known in the art and may be provided with the necessary auxiliary equipment, not shown in the drawing. Hydrocarbon vapors from the still are cooled and condensed by the cooler 50 and are conducted to the product accumulator 43 by the pipe 51. In the product accumulator 43 the condensate, comprising the heavy hydrocarbon components, is separated from the uncondensed vapors and gases. The condensate passes the float controlled valve 52 and passes to storage as product A through the pipe 53.

Uncondensed vapors and gases leave the product accumulator 43 through the back pressure regulator 54. Part of the gases and vapors may be passed through the control valve 55 and pipe 56 to the base of the desorber; the remainder is compressed and cooled, by compressor 57 and cooler 58, and passed to a second product accumulator 59. In the product accumulator 59 the lighter hydrocarbon components originally recovered in the absorber are separated, as condensate, from the uncondensed gases. The condensate, product B, is withdrawn from the product accumulator 59 through the float controlled valve 60 and passed to storage through the pipe 61. Gases from the product accumulator are passed through the control valve 62 into the pipe 63. A back pressure regulator 64 is set at a maximum pressure slightly above the normal operating pressure of the product accumulator 59. A rise in pressure in the product accumulator will cause the back pressure regulator 64 to open and release excess gases to the pipe 63. Gases from the pipe 63 may be admitted to the base of the desorber 13 through the valve 65 and to the base of the reabsorber 12 through the valve 66.

Denuded absorbent from the still 49 is pumped by the pump 67 through the cooler 68 and the cooled denuded absorbent is admitted to the top of the reabsorber 12 through the valve 69 and to the top of the absorber 11 through the pipe 17 and the valve 70. Residue gas from the top of the reabsorber passes the back pressure regulator 71 and passes out of the system through the pipe 72. The rich absorbent from the base of the reabsorber is passed by the float controlled valve 73 through the pipe 74 to the desorber 13 for demethanization. In the desorber, the rich absorbent from the absorber and reabsorber, entering the desorber through pipes 21 and 74 respectively, are stripped of methane and other undesirable gases by the action of the various gas streams entering the lower part of the desorber. The gases are fed to the desorber at various points depending upon their methane contents. Gas having the lowest methane content is fed to the bottom of the desorber, and the other gases are fed at various points above the bottom in the order of their increasing methane content. Gases from the top of the desorber are passed by the back pressure regulator 75 through the line 76 to the intake of the compressor 26. From the compressor 26 they are passed, with gases from the vent and surge tank 24, through the cooler 27 and into the base of the reabsorber 12.

As shown in the drawing, the absorber 11 is operated with a stream of denuded absorbent fed to its top, and with partly denuded absorbent fed to the absorber at appropriate points below the top plate. Partly denuded absorbent from the vent tanks may be supplied to the absorber through pipe 18, pipe 19 or through both. In order that no valuable constituents may be lost in the outlet gas by stripping of the partially denuded absorbent, the stream of denuded absorbent is introduced at the top of the absorber 11. Below the point of entry of the partly denuded absorbent, the absorbent streams combine to give an effect of high absorbent rate in the bottom section of the absorber.

The advantage of this absorption system over conventional absorption systems is that this system increases the amount of desirable hydrocarbons removed from the gas by circulating more absorption oil or lower molecular weight hydrocarbon liquid without increasing steam or heating requirements. Product is recovered from the additional amount of absorption oil by flashing the rich oil in vent tanks.

We claim:

1. The process of treating hydrocarbon gas comprising countercurrently contacting a stream of the gas with a plurality of absorbents in an absorption zone having initial and final points with respect to the gas stream, withdrawing the rich absorbent from the absorption zone, passing a part of the rich absorbent to a series of ebullition zones at successively lower pressures wherein ebullition of said rich absorbent takes place to effect partial denudation of the absorbent, passing a part of the rich absorbent to a distillation zone to release absorbed hydrocarbons and effect substantially complete denudation of the absorbent, recycling liquid effluent of one ebullition zone to the absorber at an intermediate point in relation to said initial and final points, recycling liquid effluent of a succeeding ebullition zone to the absorber at a point between said intermediate and said final points, and recycling denuded absorbent from the distillation zone to the absorber at said final point.

2. The process of treating hydrocarbon gas comprising countercurrently contacting a stream of the gas with a plurality of absorbents in an absorption zone having initial and final points of contact with respect to the gas stream, withdrawing the rich absorbent from the absorption zone, passing a part of the rich absorbent to a series of ebullition zones wherein ebullition of said rich absorbent takes place to effect partial denudation of the rich absorbent, returning liquid effluent of one ebullition zone to the absorption zone at an intermediate point in relation to said initial and final points, returning liquid effluent of a succeeding ebullition zone to the absorber at a point between said intermediate and said final point, passing vaporous effluent of the ebullition zones to a reabsorption zone, to recover desirable gases evolved in the ebullition zones, contacting the vapors in the reabsorption zone with denuded absorbent, passing liquid effluent of the reabsorption zone to a desorption zone to remove undesirable absorbed gases therefrom by displacement with desirable gases, passing a part of the rich absorbent from said absorption zone to said desorption zone, contacting the rich absorbent in the desorption zone with a stream of light hydrocarbon vapors, passing liquid effluent of the desorption zone to a distillation zone, to release absorbed hydrocarbons therefrom; passing liquid effluent of the distillation zone to the absorption zone at said final point, and passing liquid effluent of the distillation zone to the reabsorption zone as said denuded absorbent.

HAROLD R. LEGATSKI.
WILL SWERDLOFF.
GERALD W. McCULLOUGH.